US008828217B2

United States Patent
Hanks et al.

(10) Patent No.: US 8,828,217 B2
(45) Date of Patent: Sep. 9, 2014

(54) GAS AND LIQUID PHASE HYDROPROCESSING FOR BIOCOMPONENT FEEDSTOCKS

(75) Inventors: Patrick L. Hanks, Fairfax, VA (US); William E. Lewis, Baton Rouge, LA (US)

(73) Assignee: ExxonMobil Research and Engineering Company, Annandale, NJ (US)

(*) Notice: Subject to any disclaimer, the term of this patent is extended or adjusted under 35 U.S.C. 154(b) by 536 days.

(21) Appl. No.: 13/168,115

(22) Filed: Jun. 24, 2011

(65) Prior Publication Data

US 2012/0004479 A1    Jan. 5, 2012

Related U.S. Application Data

(60) Provisional application No. 61/359,873, filed on Jun. 30, 2010.

(51) Int. Cl.
| | | |
|---|---|---|
| *C10G 45/00* | (2006.01) | |
| *C10G 65/02* | (2006.01) | |
| *C10G 3/00* | (2006.01) | |
| *C10G 65/04* | (2006.01) | |
| *C10G 45/58* | (2006.01) | |
| *B01J 29/74* | (2006.01) | |
| *B01J 23/882* | (2006.01) | |

(52) U.S. Cl.
CPC ............... *C10G 65/04* (2013.01); *C10G 65/02* (2013.01); *C10G 3/46* (2013.01); *C10G 3/45* (2013.01); *B01J 29/7461* (2013.01); *B01J 23/882* (2013.01); *C10G 2300/1014* (2013.01); *C10G 3/60* (2013.01); *C10G 3/49* (2013.01); *C10G 2300/4018* (2013.01); *C10G 3/47* (2013.01); *C10G 2300/202* (2013.01); *C10G 2300/4081* (2013.01); *C10G 2300/4012* (2013.01); *C10G 3/42* (2013.01); *C10G 65/043* (2013.01); *Y02E 50/13* (2013.01); *C10G 2300/1037* (2013.01); *C10G 3/50* (2013.01); *C10G 2300/301* (2013.01); *C10G 2300/304* (2013.01); *C10G 2300/4006* (2013.01); *C10G 2300/1018* (2013.01); *C10G 45/58* (2013.01); *C10G 2400/04* (2013.01)
USPC .............. 208/57; 585/256; 585/264; 585/841

(58) Field of Classification Search
CPC .... C10G 65/12; C10G 65/04; C10G 2400/02; C10G 65/08; C10G 2400/10
USPC .......................................................... 208/57
See application file for complete search history.

(56) References Cited

U.S. PATENT DOCUMENTS

| | | |
|---|---|---|
| 3,412,016 A | 11/1968 | Graven |
| 6,123,835 A | 9/2000 | Ackerson et al. |

(Continued)

FOREIGN PATENT DOCUMENTS

| | | |
|---|---|---|
| EP | 0 819 752 B1 | 4/2001 |
| WO | 2009/052025 A2 | 4/2009 |

(Continued)

OTHER PUBLICATIONS

C. Schmitz, L. Datsevitch, A. Jess, "Deep desulfurization of diesel oil: kinetic studies and process-improvement by the use of a two-phase reactor with pre-saturator", Chemical Engineering Science 59 (2004) pp. 2821-2829.

(Continued)

*Primary Examiner* — Randy Boyer
*Assistant Examiner* — Juan Valencia
(74) *Attorney, Agent, or Firm* — Chad A. Guice

(57) ABSTRACT

Diesel fuel is produced from a feedstock that is at least partially biocomponent in origin. A feedstock is treated in a reactor including one or more hydrotreating zones having a continuous gas phase. The liquid effluent from the hydrotreating zones is then hydroprocessed in a hydroprocessing zone having a continuous liquid phase, such as a hydroprocessing zone in the same reactor. The hydroprocessing zone can be operated under effective catalytic dewaxing conditions.

20 Claims, 4 Drawing Sheets

(56) References Cited

U.S. PATENT DOCUMENTS

| | | |
|---|---|---|
| 6,428,686 B1 | 8/2002 | Ackerson et al. |
| 6,881,326 B2 | 4/2005 | Ackerson et al. |
| 7,291,257 B2 | 11/2007 | Ackerson et al. |
| 2004/0230085 A1 | 11/2004 | Jakkula et al. |
| 2005/0082202 A1 | 4/2005 | Ackerson et al. |
| 2006/0264684 A1 | 11/2006 | Petri et al. |
| 2007/0135666 A1 | 6/2007 | Koivusalmi et al. |
| 2008/0173570 A1 | 7/2008 | Marchand et al. |
| 2009/0095651 A1 | 4/2009 | Leonard et al. |
| 2009/0095653 A1* | 4/2009 | Kokayeff et al. ............... 208/57 |
| 2009/0095655 A1 | 4/2009 | Kokayeff et al. |
| 2009/0095656 A1 | 4/2009 | Kokayeff et al. |
| 2009/0107033 A1 | 4/2009 | Gudde et al. |
| 2009/0301930 A1 | 12/2009 | Brandvold et al. |
| 2010/0084313 A1* | 4/2010 | Helton et al. ................... 208/60 |
| 2010/0133144 A1* | 6/2010 | Kokayeff et al. ............... 208/57 |
| 2011/0219672 A1* | 9/2011 | Novak et al. .................... 44/307 |

FOREIGN PATENT DOCUMENTS

| | | | |
|---|---|---|---|
| WO | 2009052017 A2 | | 4/2009 |
| WO | 2010/002903 A2 | | 1/2010 |
| WO | 2010053468 | * | 5/2010 |

OTHER PUBLICATIONS

The International Search Report and Written Opinion of PCT/US2011/041756 dated Feb. 14, 2013.

* cited by examiner

GAS AND LIQUID PHASE HYDROPROCESSING FOR BIOCOMPONENT FEEDSTOCKS

CROSS-REFERENCE TO RELATED APPLICATIONS

This Application claims the benefit of U.S. Application No. 61/359,873, filed Jun. 30, 2010, the entire contents of which are hereby incorporated by reference herein.

FIELD OF THE INVENTION

The invention is related to hydroprocessing of feeds, such as feeds having a biocomponent source, to form a diesel fuel product.

BACKGROUND OF THE INVENTION

A variety of potential biological sources exist that can provide hydrocarbon molecules with chain lengths that are roughly appropriate for conversion into a diesel fuel. These biological sources can include vegetable fats or oils, animal fats or oils (including fish oils), or even fats or oils derived from algae. Based on regulatory activity by various governments, fuels derived from such biocomponent sources are likely to be increasingly important in the future.

Unfortunately, processing of biocomponent materials in conventional hydroprocessing equipment can be expensive from a refinery perspective. In particular, published literature reports of hydrogen consumption of biocomponent fuels during hydroprocessing indicate hydrogen needs in excess of 1000 scf/bbl (170 $Nm^3/m^3$). In addition to requiring large amounts of hydrogen, hydroprocessing of a biocomponent feed typically leads to production of CO and $CO_2$. These contaminant species can be pose problems for conventional hydrogen scrubbing systems, making it difficult to recycle the excess hydrogen used for processing the biocomponent feed.

International Publication No. WO 2010/002903 describes a multi-stages hydroprocessing process and apparatus. In the process, a fresh feed is divided into a series of portions. All of the hydrogen for processing the feed is introduced into a first reactor stage. Additional portions of feed are introduced into subsequent reactors. The initial reactor stages are described as having a continuous gas phase environment. Based on the addition of additional feed in subsequent stages, it is described that the final stage(s) have a continuous liquid phase environment. Optionally, a portion of the liquid product can be recycled and combined with the portion of the fresh feed entering the first reaction stage.

U.S. Published Patent Application No. 2009/0095653 describes a hydroisomerization process. The hydroisomerization is performed in a reactor that has a substantially continuous liquid phase. An excess of hydrogen gas can be present beyond the solubility limit of the feedstock. However, the flowing medium in the reactor is described as being substantially liquid-continuous. The excess hydrogen gas is described as allowing the liquid phase to remain saturated with hydrogen as the reaction proceeds. The hydrocarbon feed is described as being a Fischer-Tropsch feed or a hydroprocessed vegetable oil composed primarily of n-paraffins in the $C_8$ to $C_{30}$ carbon number range.

U.S. Pat. No. 7,291,257 describes a system and method for two phase hydroprocessing. The method is described as allowing for hydroprocessing where the need to circulate hydrogen gas or a separate hydrogen phase through the catalyst is eliminated. Instead, the hydrogen for the hydroprocessing is dissolved in the feed, which can include a diluent to increase the capability of the feed for dissolving hydrogen. Optionally, additional amounts of hydrogen gas may be present of about 10% or less relative to the total volume of the reactor.

SUMMARY OF THE INVENTION

One aspect of the invention relates to a method for making a diesel fuel product, comprising: contacting a feedstock with a hydrotreating catalyst in a plurality of hydrotreating stages under effective hydrotreating conditions, each hydrotreating stage having a continuous gas phase environment, at least a portion of the feedstock being comprised of a biocomponent feed, the feedstock having an oxygen content of at least about 1 wt % and a sulfur content of at least about 500 wppm, the feedstock having a first stoichiometric hydrogen need for said hydrotreating; mixing the feedstock, prior to or during contact with at least one additional hydrotreating stage, with a recycled product stream into which hydrogen is at least partially dissolved, the at least one additional hydrotreating stage being downstream from at least one of the plurality of hydrotreating stages; mixing the effluent from the plurality of hydrotreating stages with a second recycled product stream into which hydrogen is at least partially dissolved; separating the effluent from the plurality of hydrotreating stages into a gas phase effluent portion and a liquid phase effluent portion; and contacting the liquid phase effluent portion with a catalyst in a hydroprocessing stage having a continuous liquid phase environment under effective hydroprocessing conditions to form a diesel fuel product, the liquid phase effluent portion having a second stoichiometric hydrogen need for said hydroprocessing stage, the diesel fuel product being substantially deoxygenated and having a sulfur content of about 100 wppm or less, wherein the total treat gas rate of hydrogen relative to the feed is less than about 1.2 times the combined first and second stoichiometric hydrogen needs, and wherein the total hydrogen treat gas rate is about 750 scf/bbl (about 130 $Nm^3/m^3$) or less.

Another aspect of the invention relates to a method for making a diesel fuel product, comprising: introducing a feedstock into a reactor, the reactor including one or more hydrotreating stages in a continuous gas phase environment and a dewaxing stage in a continuous liquid phase environment, at least a portion of the feedstock being comprised of a biocomponent feed, the feedstock having an oxygen content of at least about 1 wt % and having a cloud point; contacting the feedstock with hydrotreating catalyst in the one or more hydrotreating stages under effective hydrotreating conditions, the feedstock having a first stoichiometric hydrogen need for said hydrotreating stages; mixing the feedstock, prior to or during contact with hydrotreating catalyst in at least one hydrotreating stage, with a recycled product stream into which hydrogen is or becomes at least partially dissolved; mixing the feedstock, prior to contact with dewaxing catalyst in the dewaxing stage, with a second recycled product stream into which hydrogen is or becomes at least partially dissolved; exhausting from the reactor a gas phase effluent portion of a hydrotreated effluent from the one or more hydrotreating stages; and contacting a liquid phase effluent portion of said hydrotreated effluent with dewaxing catalyst in the dewaxing stage under effective dewaxing conditions to form a diesel fuel product, the liquid phase effluent portion having a second stoichiometric hydrogen need for said dewaxing stage, the diesel fuel product being substantially deoxygenated and having a cloud point at least about 10° C. below the cloud point of the feedstock.

DETAILED DESCRIPTION OF THE EMBODIMENTS

Overview

Figure 1:
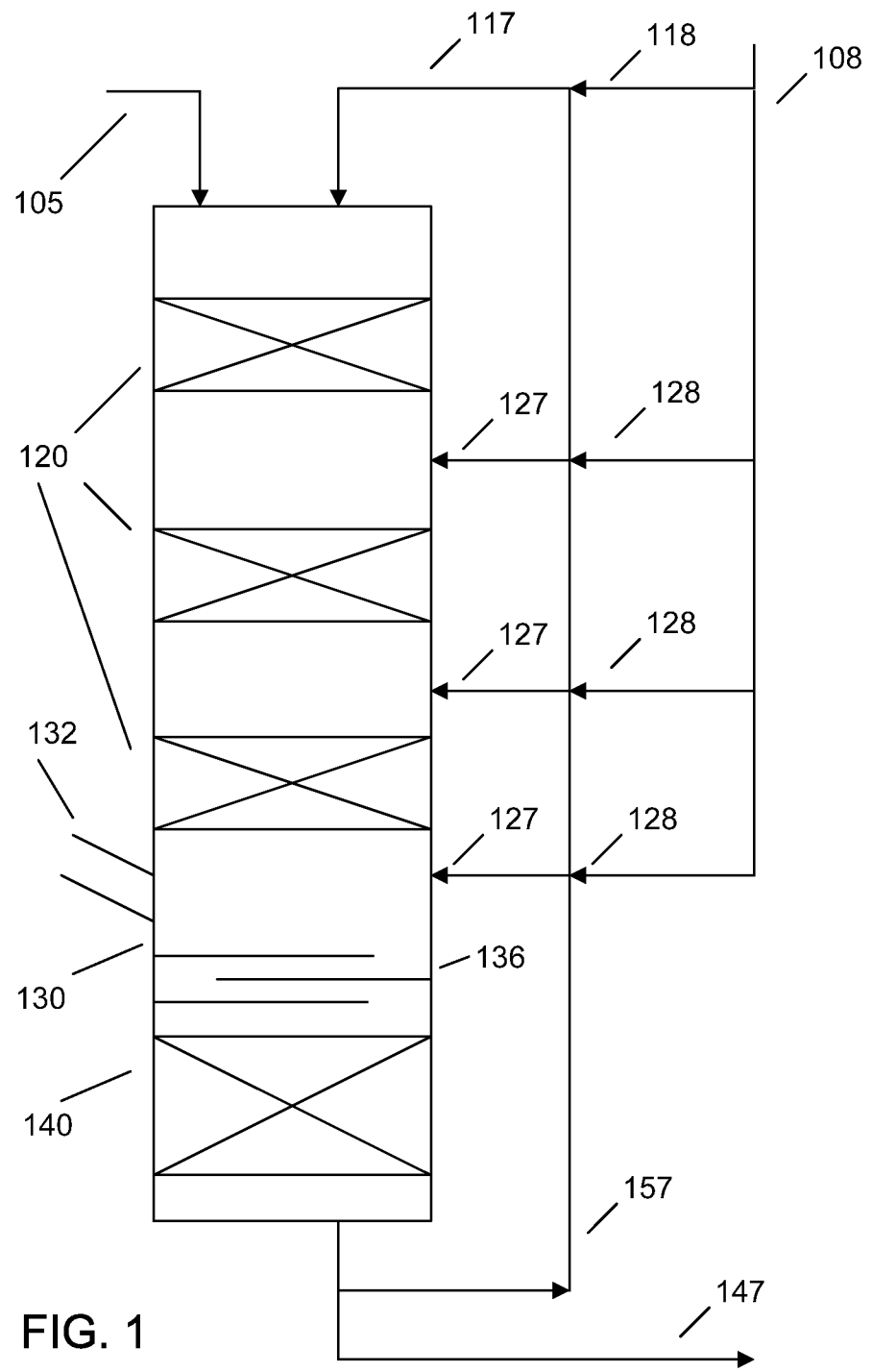
FIG. 1 schematically depicts a reaction system suitable for performing an embodiment of the invention.

In various embodiments, a system and method are provided for producing a diesel fuel from a feedstock that is at least partially biocomponent in origin. The system and method can provide reduced hydrogen consumption during hydrotreatment of the feed. If desired, the system and method can operate at hydrogen treat gas rates near the overall hydrogen consumption rate, which can avoid the need to recycle hydrogen, thus reducing and/or eliminating the need to remove CO and/or $CO_2$ from gas phase effluent produced by the reaction. Additionally or alternately, the system and method can allow for integration into a single reactor of a dewaxing and/or aromatic saturation stage while reducing and/or minimizing any poisoning of the dewaxing and/or aromatic saturation catalyst.

Additionally or alternately, a system can be provided that includes multiple catalyst beds or stages, optionally within a single reactor, which can be operated so that the one or more beds are in a continuous gas phase environment. This is the typical situation, for example, in a trickle bed reactor. However, it can be preferred for the reactor to be operated so that at least the final bed/stage is in a continuous liquid phase environment, e.g., which can be accomplished by exhausting excess gas from the reactor prior to the final bed.

Further additionally or alternately, a method can be used that provides at least one advantage for processing a feedstock at least partially derived from a biocomponent source. For a typical biocomponent feed, a full hydrodeoxygenation plus full saturation (hydrogenation) of all olefins can require well over 1000 scf/bbl (170 $Nm^3/m^3$) of hydrogen. However, the hydrogen required to deoxygenate a feed can be reduced by performing the deoxygenation with reduced amounts of hydrogen, e.g., by using a low overall gas treat rate and/or by introducing a portion of the hydrogen at one or more intermediate locations in the reactor.

Still further additionally or alternately, another set of advantages can be related to the handling of CO and $CO_2$. CO and $CO_2$ are generally produced during deoxygenation of a biocomponent feed. In embodiments involving exhausting the gas to form a continuous liquid phase environment for the final reaction bed, the final catalyst bed can include a Group VIII noble metal (e.g., Pd- and/or Pt-containing) catalyst or another catalyst susceptible to CO and/or $CO_2$ poisoning. Because CO and $CO_2$ have relatively low solubilities in most hydrocarbon feeds, any poisoning from dissolved CO and/or $CO_2$ can be mitigated for a catalyst in such a continuous liquid phase environment.

Yet further additionally or alternately, another set of advantages can be related to avoiding recycling of exhaust gas from the continuous gas phase reaction stages. For instance, by using a relatively low treat gas rate, the exhaust gas after the continuous gas phase stages can have a relatively low hydrogen content. Instead of attempting to recycle this exhaust to recover hydrogen, the exhaust can optionally but advantageously be sent to a refinery system tolerant of the levels of CO and/or $CO_2$ present therein, such refinery system potentially including the fuel gas burner. This can reduce and/or minimize the number/type of refinery components that could need to be upgraded to handle the potentially corrosive environment that can be created when excess CO and/or $CO_2$ is present.

Again further additionally or alternately, the system and method can provide process flexibility while maintaining catalyst beds in a desired environment. For instance, by exhausting gas prior to the final bed, definite regions of continuous gas phase environment and continuous liquid phase environment can be created. As a result, some or all of the reactivity benefits of plug-flow operation can be captured for the beds operated in a continuous gas phase environment. In such situations, the amount of gas in the reactor does not necessarily need to be constrained to maintain a level close to the transition for forming a continuous liquid phase environment. Additionally or alternately, the exhaust can allow for a continuous liquid phase environment with little or no excess gas, which can advantageously reduce the amount of contaminants, such as CO and/or $CO_2$, that could implicate separation/removal from the product of the final processing stage.

Feedstocks

In various embodiments of the invention, the feedstock can include feeds from biocomponent sources, such as vegetable, animal, fish, and/or algae. Generally, these biological materials include vegetable fats/oils, animal fats/oils, fish oils, pyrolysis oils, and algae lipids/oils, as well as components of such materials. More specifically, the lipid material includes one or more type of lipid compounds. Lipid compounds are typically biological compounds that are insoluble in water, but soluble in nonpolar (or fat) solvents. Non-limiting examples of such solvents include alcohols, ethers, chloroform, alkyl acetates, benzene, and combinations thereof.

Major classes of lipids include, but are not necessarily limited to, fatty acids, glycerol-derived lipids (including fats, oils and phospholipids), sphingosine-derived lipids (including ceramides, cerebrosides, gangliosides, and sphingomyelins), steroids and their derivatives, terpenes and their derivatives, fat-soluble vitamins, certain aromatic compounds, and long-chain alcohols and waxes.

In living organisms, lipids generally serve as the basis for cell membranes and as a form of fuel storage. Lipids can also be found conjugated with proteins or carbohydrates, such as in the form of lipoproteins and lipopolysaccharides.

Examples of vegetable oils that can be used in accordance with this invention include, but are not limited to rapeseed (canola) oil, soybean oil, coconut oil, sunflower oil, palm oil, palm kernel oil, peanut oil, linseed oil, tall oil, corn oil, castor oil, jatropha oil, jojoba oil, olive oil, flaxseed oil, camelina oil, safflower oil, babassu oil, tallow oil and rice bran oil.

Vegetable oils as referred to herein can also include processed vegetable oil material. Non-limiting examples of processed vegetable oil material include fatty acids and fatty acid alkyl esters. Alkyl esters typically include $C_1$-$C_5$ alkyl esters. One or more of methyl, ethyl, and propyl esters are preferred.

Examples of animal fats that can be used in accordance with the invention include, but are not limited to, beef fat (tallow), hog fat (lard), turkey fat, fish fat/oil, and chicken fat. The animal fats can be obtained from any suitable source including restaurants and meat production facilities.

Animal fats as referred to herein also include processed animal fat material. Non-limiting examples of processed animal fat material include fatty acids and fatty acid alkyl esters. Alkyl esters typically include $C_1$-$C_5$ alkyl esters. One or more of methyl, ethyl, and propyl esters are preferred.

Algae oils or lipids are typically contained in algae in the form of membrane components, storage products, and metabolites. Certain algal strains, particularly microalgae such as diatoms and cyanobacteria, contain proportionally high levels of lipids. Algal sources for the algae oils can contain varying amounts, e.g., from 2 wt % to 40 wt % of lipids, based on total weight of the biomass itself.

Algal sources for algae oils include, but are not limited to, unicellular and multicellular algae. Examples of such algae include a rhodophyte, chlorophyte, heterokontophyte, tribophyte, glaucophyte, chlorarachniophyte, euglenoid, haptophyte, cryptomonad, dinoflagellum, phytoplankton, and the like, and combinations thereof. In one embodiment, algae can be of the classes Chlorophyceae and/or Haptophyta. Specific species can include, but are not limited to, *Neochloris oleoabundans, Scenedesmus dimorphus, Euglena gracilis, Phaeodactylum tricornutum, Pleurochrysis camerae, Prymnesium parvum, Tetraselmis chui,* and *Chlamydomonas reinhardtii*.

The feedstock can include varying amounts of feedstreams based on biocomponent sources. Advantageously, the feed can include at least about 0.1 wt % of feed based on a biocomponent source, for example at least about 0.5 wt %, at least about 1 wt %, at least about 3 wt %, at least about 5 wt %, at least about 10 wt %, at least about 15 wt %, or at least about 20 wt %. In such embodiments, the feed can additionally or alternately include about 60 wt % or less of biocomponent feed, for example about 50 wt % or less, about 40 wt % or less, about 30 wt % or less, or about 25 wt % or less.

The biocomponent feeds useful in the present invention can include any of those which comprise primarily triglycerides and free fatty acids (FFA). The triglycerides and FFAs typically contain aliphatic hydrocarbon chains in their structure having from 8 to 36 carbons, preferably from 10 to 26 carbons, for example from 12 to 22 carbons, from 12 to 18 carbons, or from 14 to 22 carbons. Types of triglycerides can be determined according to their fatty acid constituents. The fatty acid constituents can be readily determined using Gas Chromatography (GC) analysis. This analysis involves extracting the fat or oil, saponifying (hydrolyzing) the fat or oil, preparing an alkyl (e.g., methyl) ester of the saponified fat or oil, and determining the type of (methyl) ester using GC analysis. In one embodiment, a majority (i.e., greater than 50%) of the triglyceride present in the lipid material can be comprised of $C_{10}$ to $C_{26}$ fatty acid constituents, based on total triglyceride present in the lipid material. Further, a triglyceride is a molecule having a structure identical to the reaction product of glycerol and three fatty acids. Thus, although a triglyceride is described herein as being comprised of fatty acids, it should be understood that the fatty acid component does not necessarily contain a carboxylic acid hydrogen. Additionally or alternately, a majority of triglycerides present in the biocomponent feed can preferably be comprised of $C_{12}$ to $C_{18}$ fatty acid constituents, based on total triglyceride content. Other types of feed that are derived from biological raw material components can include fatty acid esters, such as fatty acid alkyl esters (e.g., FAME and/or FAEE).

Biocomponent based diesel boiling range feedstreams typically have relatively low nitrogen and sulfur contents. For example, a biocomponent based feedstream can contain up to about 300 wppm nitrogen, for example up to about 100 wppm nitrogen. Instead of nitrogen and/or sulfur, the primary heteroatom component in biocomponent feeds is oxygen. Biocomponent diesel boiling range feedstreams, e.g., can include as much as about 14 wt % oxygen content, as much as about 12 wt % oxygen content, or as much as about 10 wt % oxygen content. Suitable biocomponent diesel boiling range feedstreams, prior to hydrotreatment, can include at least about 5 wt % oxygen content, for example at least about 8 wt % oxygen content. Additionally or alternately, a biocomponent feedstream, prior to hydrotreatment, can include an olefin content of at least about 3 wt %, for example at least about 5 wt % or at least about 10 wt %. The biocomponent portion of the feedstock can have been previously hydrotreated, or not previously hydrotreated.

In various embodiments of the invention, the feedstock can additionally or alternately include a mineral hydrocarbon portion. A mineral hydrocarbon feedstock refers to hydrocarbons derived from crude oil that has optionally been subjected to one or more separation and/or other refining processes. Mineral hydrocarbon feedstocks useful according to the methods of the invention can include petroleum feedstocks boiling approximately in the diesel range. Additionally or alternately, suitable feedstocks can include virgin distillates, hydrotreated virgin distillates, light cycle oils, demetallized oils, FCC cracked products (e.g., heavy cracked naphtha), jet fuel boiling range distillate fraction, kerosene boiling range distillate fraction, and combinations thereof.

The mineral portion of the feedstock can have an initial boiling point of at least about 115° C., for example at least about 140° C., at least about 150° C., at least about 170° C., or at least about 175° C. Further, a feed can be characterized based on the portion of the feed that boils at a temperature and/or based on measurable properties such as cold flow properties (e.g., cloud point). For instance, a T5 boiling point can be defined as the temperature at which 5% of the feed will boil. Thus, when the feedstock is characterized based on boiling point range, the feedstock can additionally or alternately have a T5 boiling point of at least about 150° C., for example at least about 175° C. or at least about 190° C. Further additionally or alternately, the feedstock can have a final boiling point of about 455° C. or less, for example about 440° C. or less, about 425° C. or less, about 410° C. or less, about 400° C. or less, about 375° C. or less, or about 350° C. or less. Still further additionally or alternately, the feedstock can have a T95 boiling point of about 440° C. or less, for example about 425° C. or less, about 400° C. or less, about 375° C. or less, or about 350° C. or less.

The mineral feedstock can contain nitrogen-containing compounds (abbreviated as "nitrogen" or "nitrogen content") and typically also sulfur-containing compounds (abbreviated as "sulfur" or "sulfur content"). In general, at least a majority of the nitrogen can be in the form of organonitrogen compounds. Additionally or alternately, at least a majority of the sulfur can be in the form of organosulfur compounds.

Mineral hydrocarbon feedstreams can typically have a nitrogen content of at least about 5 wppm, based on the total weight of the mineral hydrocarbon component, and/or can typically contain no greater than about 1.0 wt % nitrogen, based on the total weight of the mineral hydrocarbon component. Mineral hydrocarbon feedstreams can also typically have a sulfur content of at least about 100 wppm (e.g., often greater than about 500 wppm or greater than about 0.1 wt %), based on the total weight of the mineral hydrocarbon component, and/or can typically contain no greater than about 6 wt % nitrogen (e.g., often no greater than about 4 wt % nitrogen), based on the total weight of the mineral hydrocarbon component. Additionally or alternately, the mineral feedstreams suitable for use in various embodiments can have a nitrogen content from about 50 wppm to about 6000 wppm, preferably from about 50 wppm to about 2000 wppm, from about 50 wppm to about 1500 wppm, or from about 75 wppm to about 1000 wppm. Further additionally or alternately, mineral feedstreams suitable for use in various embodiments can have a sulfur content from about 100 wppm to about 40,000 wppm, for example from about 100 wppm to about 30,000 wppm or from about 200 wppm to about 20,000 wppm, preferably from about 200 wppm to about 10,000 wppm, from about 200 wppm to about 5000 wppm, or from about 350 wppm to about 2500 wppm sulfur.

The content of sulfur, nitrogen, oxygen, and olefins in a feedstock created by blending two or more feedstocks can typically be determined using a weighted average based on the blended feeds. For example, a mineral feed and a biocomponent feed can be blended in a ratio of about 80 wt % mineral feed and about 20 wt % biocomponent feed. If the mineral feed has a sulfur content of about 1000 wppm, and the biocomponent feed has a sulfur content of about 10 wppm, the resulting blended feed could be expected to have a sulfur content of about 802 wppm. In various embodiments, a feedstock containing a blend of a biocomponent feed and a mineral feed can have an oxygen content of at least about 1 wt %, for example at least about 2 wt %, at least about 4 wt %, or at least about 5 wt %.

In some embodiments, the reactor includes a recycle loop for recycling a portion of the liquid effluent from the reactor. In such embodiments, recycling of a portion of the product can assist with maintaining temperature control in the reactor. The amount of product recycle can be from about 5 to 95% of the total liquid effluent by volume. The amount of product recycle can be at least about 20%, or at least about 30%, or at least about 50% of the liquid effluent. The amount of product recycle can be about 90% or less, or about 75% or less, or about 60% or less of the liquid effluent. In another embodiment, the amount of product recycle is about 30 to 70% of the liquid effluent.

Other Reactor Inputs

In an embodiment, at least a portion of the product recycle can enter the reactor in a location upstream from the first hydrotreating stage. Additionally or alternately, a portion of the product recycle can be mixed with the fresh feed, and the mixture can be introduced into the reactor. One or more additional product recycle streams can enter the reactor at the same or other locations. For example, a product recycle stream can enter the reactor upstream of each catalyst bed or stage. In such an embodiment, if a reactor contains a total of four catalyst beds, a portion of product recycle could enter upstream of all of the beds, and additional portions could enter between each pair of beds (e.g., between each pair of continuous gas phase beds/stages). Further additionally or alternately, additional portions of recycle product can be introduced between some, but not all, of the catalyst beds or stages. In embodiments where one or more portions of product recycle are introduced into the reactor, each of the product recycle flows can have approximately the same flow rate, each of the product recycle flows can have a different flow rate, or combinations of some similar and some different flow rates can be used. For example, the product recycle flow entering the reactor prior to the first reaction stage can have a first flow rate while the remaining product recycle flows can have a second flow rate different from the first flow rate.

Hydrogen can be introduced into the reactor in several manners. One option for introducing hydrogen can be as part of one or more gas phase hydrogen input flows. A gas phase hydrogen input flow can optionally include an inert diluent, such as nitrogen. When the hydrogen input is not approximately pure (~100%), the hydrogen content of the gas phase hydrogen input flow can be at least about 25 vol %, for example at least about 50 vol %, at least about 70 vol %, at least about 80 vol %, or at least about 90 vol %. Additionally or alternately, the hydrogen content of the gas phase hydrogen input flow can be about 100 vol % or less, for example about 95 vol % or less, about 90 vol % or less, about 80 vol % or less, about 70 vol % or less, about 60 vol % or less, or about 50 vol % or less. It is noted that a sufficient amount of gas can often be needed in order to maintain a continuous gas phase for the relevant beds/stages in the reactor. In embodiments where the hydrogen content of the gas phase hydrogen input flow is not sufficient to maintain a continuous gas phase environment for the relevant beds/stages, the non-hydrogen portions of the gas phase hydrogen input flow can provide the additional gas needed to maintain the continuous gas phase environment.

Additionally or alternately, hydrogen can be introduced into the reactor by at least partially dissolving hydrogen gas in a liquid input flow (i.e., at least partially saturating the liquid input flow with hydrogen, but "saturating" is meant in this context to indicate physical saturation, without reference to chemical saturation or hydrogenation). Optionally, the fresh feed to the reactor can have hydrogen at least partially dissolved therein. Further additionally or alternately, the recycle product can have hydrogen at least partially dissolved therein, perhaps even at approximately the solubility limit (in the context of solubility of gas in liquid, as used herein, the phrase "approximately the solubility limit" should be understood to mean a concentration corresponding to at least 85% of the solubility limit, preferably to at least 90% of the solubility limit, for example to at least 95% of the solubility limit or to at least 99% of the solubility limit, which can, of course, include super-saturated solutions, that may correspond to up to 115% of the solubility limit, preferably to up to 110% of the solubility limit, for example to up to 105% of the solubility limit), prior to entering the reactor. Further additionally or alternately, hydrogen can be at least partially dissolved in a liquid input flow, after which point both the liquid input flow and a gas phase hydrogen input flow can be introduced into the reactor.

In embodiments where hydrogen enters the reactor in multiple locations, various methods can be used to divide the hydrogen between the input locations. For instance, roughly an equal amount of hydrogen can be introduced at each location. Alternately, a relatively greater amount of hydrogen can be introduced upstream of the reaction stages, with relatively smaller amounts at the remaining input locations. As one example, hydrogen can be introduced into the reactor as an at least partially saturated recycled product flow prior to each hydroprocessing stage. For instance, in this example, the recycled product flows prior to each hydroprocessing stage can have hydrogen dissolved therein at approximately the solubility limit. Additionally or alternately in this example, each recycle product flow can have approximately the same flow rate into the reactor. Also additionally or alternately, any additional hydrogen needed to reach a desired total treat gas rate can be introduced as a gas phase hydrogen input flow prior to the first reaction stage.

Hydroprocessing for Deoxygenation of a Feed

In conventional hydrotreatment of a diesel boiling range feed, the ratio of amount of hydrogen delivered to a reactor versus the flow rate of the feed can generally be much greater than the amount necessary to replace the hydrogen consumed by the feed. Typical treat gas ratios involve a hydrogen flow rate of at least three to four (or more) times larger than the needed hydrogen based on the feed rate. The needed hydrogen can be determined based on a prior experiment using an excess of hydrogen (such as three times or more compared to the stoichiometric need), or the needed hydrogen can be determined stoichiometrically. Conventionally, this excess hydrogen is believed to be necessary in order to efficiently process a feedstock.

It is noted that many general descriptions of hydrotreatment processes have broad ranges for the treat gas ratio, which can reflect the widely varying stoichiometric needs of various feeds, inter alia. The treat gas ratio is typically expressed as the amount of hydrogen relative to the total amount of feed (such as scf/bbl, Nl/l, or $Nm^3/m^3$). For example, a feed with less than about 0.5 wt % sulfur content and substantially no aromatics would have a hydrogen need on the order of only a few tens of scf/bbl, while a feed with a substantial aromatics content that needed saturation could require on the order of several hundreds of scf/bbl. Thus, a broad range of hydrogen treat gas ratios, by itself, can provide relatively little insight regarding the question of how the amount of hydrogen provided to a specific feed should relate to that specific feed's hydrogen consumption.

It is noted that oxygen can be removed with little or no hydrogen consumption under some removal mechanisms, which could create an ambiguity in the hydrogen need under some definitions. In order to avoid this ambiguity, if the hydrogen need is determined stoichiometrically, the hydrogen need is defined to include the amount of hydrogen needed to remove any oxygen in the feed by a hydrodeoxygenation mechanism. This can be referred to as the stoichiometric hydrodeoxygenation hydrogen need for a feedstock. Of course, hydrogen needed for sulfur removal, nitrogen removal, olefin saturation, and other typical hydrogen requirements during hydrotreatment are also included in the stoichiometric hydrodeoxygenation hydrogen need.

While hydrotreatment can be an effective way to deoxygenate a biocomponent feedstock, such feedstocks can tend to have much larger hydrogen consumption requirements than similar boiling range mineral feedstocks. For example, due to relatively high oxygen and olefin contents, a biocomponent feed can require about 1500 scf/bbl (about 250 $Nm^3/m^3$) or more of hydrogen in order to both saturate (in this context, chemically, not physically) and deoxygenate the feed. Thus, hydroprocessing of one barrel of diesel range biocomponent feedstock under conventional conditions can often require the same amount of hydrogen as about five to about seven barrels (or more) of a typical mineral diesel feed.

Hydroprocessing of biocomponent feedstocks can also produce additional waste byproducts normally present at relatively minimal levels in hydroprocessing of a mineral feed. For example, deoxygenation of a biocomponent feed in an excess hydrogen environment can typically lead to removal of a substantial amount of oxygen, e.g., as water. Since biocomponent feedstreams can typically include as much as about 14 wt % oxygen content (e.g., as much as about 12 wt % oxygen content or as much as about 10 wt % oxygen content) and/or (prior to any hydrotreatment) can typically include at least about 5 wt % oxygen content (for example at least about 8 wt % oxygen content), a substantial amount of oxygen byproducts (e.g., water) can be produced by deoxygenation. Some oxygen can additionally or alternatively be removed as carbon dioxide and/or carbon monoxide. The carbon monoxide can pose a particular problem during biocomponent processing, as carbon monoxide is generally not removed by typical scrubbers used for refinery hydrogen loops. When a mineral feedstock is processed using a relatively high hydrogen treat gas ratio, the excess hydrogen can advantageously be recycled. This can somewhat mitigate the burden a relatively high hydrogen treat gas ratio can place on the cost of the process and/or the availability of hydrogen in the refinery. The carbon monoxide generated during processing of a biocomponent feed, however, can make it more difficult to recycle such excess hydrogen.

One method for reducing hydrogen consumption can include operating at relatively lower hydrogen partial pressures. This tactic is believed to modify the pathway by which a biocomponent feed is deoxygenated. By reducing the available hydrogen for turning oxygen into water, more oxygen is believed to be removed by competing pathways, e.g., where oxygen leaves instead as a carbon oxide such as carbon dioxide. However, such methods still typically employ relatively large ratios of hydrogen treat gas to feedstock.

With regard to products, hydrotreatment of a biocomponent feedstock using relatively low hydrogen partial pressures can lead to a decreased amount of water, an increase in carbon dioxide, and/or an increase in carbon monoxide, relative to a higher hydrogen partial pressure process. Additionally or alternately, a more detailed analysis of the carbon chains in such products would be believed to likely show a slight decrease in average chain length for the relatively low hydrogen partial pressure case, due to the carbon atoms that are incorporated into the increased amounts of carbon oxides.

Hydrotreatment of a biocomponent feed at both a relatively low hydrogen partial pressure and a relatively low treat gas ratio can provide several advantages over conventional methods. Processing at relatively low hydrogen partial pressure can achieve the benefits of removing oxygen with reduced hydrogen consumption, as described above. Additionally or alternately, by using a relatively low treat gas ratio, the apparent hydrogen consumption can be further reduced, e.g., by facilitating the water gas shift reaction, in which water and carbon monoxide are converted (in an equilibrium manner) into hydrogen and carbon dioxide. The equilibrium water gas shift reaction can be written as:

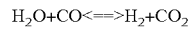

$$H_2O + CO \Longleftrightarrow H_2 + CO_2$$

Since the water gas shift reaction is generally an equilibrium process, a surplus of one of the components can tend to drive the reaction toward consumption of that component. Similarly, the equilibrium can generally favor formation of a component present in small quantities relative to the other components. Without being bound by any particular theory, it is believed that providing both a relatively low hydrogen partial pressure and a relatively low treat gas ratio can create conditions favorable for formation of hydrogen using the water gas shift reaction. As hydrogen is formed by the reaction, carbon dioxide can also be formed, while water and carbon monoxide can be desirably consumed. This can advantageously lead to reduced levels of carbon monoxide, which can often be considered beneficial, as carbon monoxide can tend to be difficult to remove from a hydrogen containing stream.

Continuous Gas Phase Beds—Hydrotreating

In various embodiments, the feedstock can be hydrotreated in one or more hydrotreating stages and/or reactors. At least one (or perhaps each) of the hydrotreatment stages can be any suitable type of hydrotreatment stage that is in a continuous gas phase environment, such as a trickle bed reactor. Optionally, a final hydrotreatment stage can be a hydrotreatment stage that is in a continuous liquid-phase environment. A hydrotreatment stage can involve exposing the feedstock to a suitable hydrotreating catalyst in the presence of hydrogen under effective hydrotreating conditions. Any desirable number of hydrotreatment stages in a continuous gas phase environment can be used prior to the final hydroprocessing stage(s) in a continuous liquid environment, e.g., at least one, at least two, at least three, or at least four.

A hydrotreatment catalyst can contain at least one of Group VIB and/or Group VIII metals, optionally on a support. Examples of suitable (optional) support materials can include alumina, silica, titania, zirconia, silica-alumina, combinations thereof, or any other suitable refractory material. Examples of Group VIB metals can include molybdenum and/or tungsten. Examples of Group VIII materials can include nickel, cobalt, and/or iron. One example of a hydrotreating catalyst can include from about 1 wt % to about 5 wt % of Co and about 4 wt % to about 20 wt % of Mo supported on a suitable support (e.g., silica, alumina, titania, silica-alumina, or a combination thereof). Another example of a hydrotreating catalyst can be a catalyst that includes from about 1 wt % to about 5 wt % of Ni and about 4 wt % to about 20 wt % of Mo and/or W, supported on a suitable support. In some embodiments, the hydrotreating catalyst can be catalyst with a relatively lower level of hydrogenation activity, such as a catalyst containing Co as a Group VIII metal, as opposed to a catalyst containing Ni, Pt, or Pd as a Group VIII metal. Additionally or alternately, at least a portion of one or more catalyst beds and/or stages can include an additional type of catalyst, such as a hydrocracking catalyst, a hydrofinishing catalyst, a dewaxing catalyst, or a combination thereof.

The effective hydrotreating conditions can include one or more of: a temperature of at least about 260° C., for example at least about 300° C.; a temperature of about 425° C. or less, for example about 400° C. or less or about 350° C. or less; a total pressure of at least about 300 psig (about 2.1 MPag), for example at least about 350 psig (about 2.4 MPag) or at least about 400 psig (about 2.8 MPag); a total pressure of about 3000 psig (about 20.7 MPag) or less, for example about 1500 psig (about 10.3 MPag) or less, about 800 psig (about 5.5 MPag) or less, or about 500 psig (about 3.4 MPag) or less; a hydrogen partial pressure of at least about 20 psia (about 140 kPaa), for example at least about 25 psia (about 170 kPaa), at least about 50 psia (about 350 kPaa), or at least about 100 psia (about 690 kPaa); a hydrogen partial pressure of about 500 psia (about 3.4 MPaa) or less, for example about 350 psia (about 2.4 MPaa) or less, about 250 psia (about 1.7 MPaa) or less, or about 175 psia (about 1.2 MPaa) or less; a liquid hourly space velocity (LHSV) of at least about 0.1 $hr^{-1}$, for example at least about 0.3 $hr^{-1}$, at least about 0.5 $hr^{-1}$, or at least about 1.0 $hr^{-1}$ (note that the LHSV refers to the space velocity of the fresh feed entering the hydrotreating bed(s)/stage(s) relative to the total amount of catalyst for the bed(s)/stage(s) in the continuous gas phase environment); an LHSV of about 15 $hr^{-1}$ or less, for example about 10 $hr^{-1}$ or less, about 5 $hr^{-1}$ or less, about 2.5 $hr^{-1}$ or less, about 2 $hr^{-1}$ or less, about 1.5 $hr^{-1}$ or less, or about 1.2 $hr^{-1}$ or less; a hydrogen treat gas rate of at least about 300 scf/bbl (about 50 $Nm^3/m^3$), for example at least about 400 scf/bbl (about 70 $Nm^3/m^3$), at least about 500 scf/bbl (about 85 $Nm^3/m^3$), or at least about 1000 scf/bbl (about 170 $Nm^3/m^3$) (note that the hydrogen treat gas rate refers to the total amount of hydrogen provided to the reactor, whether as a gas phase flow or as dissolved hydrogen in a liquid flow; in embodiments where hydrogen is introduced at more than one location in the reaction system, the hydrogen treat gas rate includes hydrogen introduced at a location downstream of one or more reaction beds/stages; if hydrogen is introduced as part of a flow that includes a diluent gas, the total gas flow into the reactor will be correspondingly greater); and a hydrogen treat gas rate of about 10000 scf/bbl (about 1700 $Nm^3/m^3$) or less, for example about 5000 scf/bbl (about 850 $Nm^3/m^3$) or less (e.g., in relatively low treat gas rate and/or relatively low hydrogen partial pressure conditions, about 900 scf/bbl (about 150 $Nm^3/m^3$) or less, about 800 scf/bbl (about 140 $Nm^3/m^3$) or less, about 750 scf/bbl (about 130 $Nm^3/m^3$) or less, or about 550 scf/bbl (about 95 $Nm^3/m^3$) or less.

In various embodiments, multiple hydrogen input flows can be used to avoid excessive hydrogen consumption in the first (each) reaction stage. As shown in Example 1 below, the amount of hydrogen consumed in hydrotreatment of a biocomponent feed can be influenced by the amount of hydrogen available. By introducing only a portion of the hydrogen at the top of the reactor, excessive hydrogen consumption for deoxygenation can be reduced.

As an example, consider a reactor containing four beds of hydrotreatment catalyst, with the fourth bed being operated in a continuous liquid environment. A total desired hydrogen treat rate relative to fresh feed can be about 400 scf/bbl (about 70 $Nm^3/m^3$). For the purposes of this example, it is assumed that a recycled product flow has a solubility of about 100 scf/bbl (17 $Nm^3/m^3$). In this example, recycled product streams saturated with hydrogen can be introduced prior to each bed, each product stream having a flow rate of about half of the fresh feed flow rate. Based on this, about 200 scf/bbl (about 34 $Nm^3/m^3$) of hydrogen relative to fresh feed can be introduced by the recycled product streams. The remaining ~200 scf/bbl (about 34 $Nm^3/m^3$) of hydrogen can be introduced as a gas phase hydrogen input flow prior to the first hydrotreatment bed. Optionally, this gas phase hydrogen input flow can be introduced as part of a mixed liquid/gas flow with the first of the recycled product stream portions.

Transition to Continuous Liquid Phase and Gas Exhaust

After the final hydrotreatment stage in a continuous gas phase environment, gas can be withdrawn from the reactor to allow for a transition to the hydroprocessing stage(s) that are in a continuous liquid phase environment. In this transition zone, the liquid treated in the upstream hydrotreatment stages can be passed to a downstream stage in a continuous liquid phase environment. The gas can be exhausted from the reactor, preferably with as little entrainment of treated liquid product as possible.

One option for withdrawing or exhausting the gas from the reactor can be to use reactor internals to set up a separation stage or transition zone within the reactor. For example, one or more stripping trays and/or inert catalyst beds can be included downstream from the last continuous gas phase hydrotreatment zone. The stripping tray(s) and/or inert catalyst bed(s) can create a stripping zone to allow the gas phase portion of the feed to separate from the liquid phase portion. The stripping tray(s) and/or inert catalyst bed(s) can advantageously be located downstream from the exhaust point. Optionally, an inert bed can additionally or alternately be included above the transition zone for exhausting the gas, with the goal of reducing/minimizing the impact of the fluid dynamics in the transition zone on the desired plug-flow characteristics of the hydrotreatment stages in a continuous gas phase environment. In addition to and/or in place of the bed of inert particles, other structures effective for at least partially isolating the transition zone could be used, e.g., holdup trays, perforated plates, or other suitable reactor internals, or combinations thereof.

The transition zone can include one or more outlet conduits for exhausting gas from the reactor. The one or more outlet conduits can be in fluid communication with the reactor at a level downstream from the bottom of the inert bed (or other pre-transition zone set of internals) and upstream from the beginning of the continuous liquid phase environment. Additionally or alternately, if an internal structure is not used to isolate the transition zone, the one or more outlet conduits can be located downstream from the bottom of the final hydrotreatment stage in a continuous gas phase environment.

Although stripping trays can be used as a reactor internal for separating a gas phase effluent portion and a liquid phase effluent portion, use of a stripping gas is optional. If a stripping gas is used, the stripping gas can be a hydrogen-containing stream, an inert gas stream, a steam flow, another suitable gas flow, or a combination of gas flows.

The one or more exhaust conduits can exit the reactor initially at an upward angle relative to horizontal, so that gravity can assist in flowing any liquid out of the conduit toward the continuous liquid phase. Optionally, one or some or each of the exhaust conduits can include a structure to separate out fluid entrained in the gas flow, e.g., a mesh pad similar to the pads used in a conventional separator drum.

Any $H_2S$, $NH_3$, CO, and $CO_2$ generated during hydrotreatment can advantageously exit the reactor as part of the exhausted gas. In embodiments where the hydrogen treat gas rate is less than about 1.2 times the stoichiometric need, the gas phase exhausted from the transition zone can have a relatively low content of hydrogen. Based on the relatively low concentration of hydrogen and the presence of difficult contaminants such as CO and $CO_2$, the gas exhausted from the reactor can be used for fuel gas, or for another purpose that does not require separating the hydrogen in the exhaust gas from the other contaminants. In embodiments where a stripping gas is not used, it is noted that some contaminants may remain dissolved in the liquid effluent after separation.

In embodiments where the final hydrotreating stage in a continuous gas phase environment is the final treatment stage in the reactor (e.g., such as where the first stage is in a continuous liquid phase environment but the flow of the reactor is such that the first stage is experienced last temporally), the total effluent from the reactor can be passed into a separation device, such as a hot, high pressure separator drum, to separate the gas phase portion of the effluent from the liquid phase portion of the effluent. The liquid phase portion of the effluent can then be passed to a reactor with a continuous liquid phase environment. In such embodiments, the separation can be performed at a pressure comparable to the pressure in the reactor, e.g., to reduce/minimize any loss of hydrogen dissolved in the liquid phase effluent to the gas phase.

Additionally or alternately, a separator drum can be used as a final hydroprocessing stage in a continuous liquid phase environment, in which case the total effluent from the gas phase reactor can be passed into the separator drum. A bed of catalyst can be included in the bottom portion of the separator drum. As the liquid portion of the effluent is separated out, the liquid can pass through the bed of catalyst and can react using the hydrogen dissolved in the liquid effluent.

Continuous Liquid Phase Beds—Catalytic Dewaxing

After hydrotreatment in the hydrotreatment stages that have a continuous gas phase environment, the dissolved hydrogen in the hydrotreated liquid can be used for an additional hydroprocessing stage with a continuous liquid environment. One option for an additional processing stage is to expose the feed to a dewaxing catalyst under catalytic dewaxing conditions. In this type of processing stage, there are two primary phases; the dewaxing catalyst can provide a solid phase, while the hydrotreated feed can provide the continuous liquid phase. Bubbles or other small regions of gas may exist within the continuous liquid phase, but the continuous liquid phase can remain the continuous phase surrounding the bed of catalyst particles in the reaction stage having a continuous liquid environment. In various embodiments, the volume occupied by a gas phase in the liquid-continuous reactor can be less than about 10% of the reactor volume, for example less than about 5%.

One advantage of hydroprocessing in a liquid continuous reactor can be that an excess of hydrogen is not required. Instead, an amount of hydrogen comparable to the amount needed for the hydroprocessing reaction can be sufficient. For example, a catalytic dewaxing process can consume from about 25 scf/bbl (about 4 $Nm^3/m^3$) of hydrogen to about 500 scf/bbl (about 85 $Nm^3/m^3$). However, this consumption typically only applies to a fresh feed. A feed that has previously been dewaxed (e.g., a recycled feed) can consume much less, and possibly no, additional hydrogen.

The hydrogen solubility limit for a typical hydrocarbon feedstock can generally be from about 30 scf/bbl (about 5 $Nm^3/m^3$) to about 200 scf/bbl (about 34 $Nm^3/m^3$), which applies to the total feed, including any portions of the feed that have been previously processed. As a result, mixing a recycled portion of feed with fresh feed can increase the hydrogen available for processing a fresh feed. By contrast, the solubility limit of CO and $CO_2$ in (a typical hydrocarbon feedstock in) the continuous liquid phase can be relatively low, which means that continuous liquid phase reactions can advantageously reduce/minimize any potential poisoning of the hydroprocessing (e.g., dewaxing) catalyst due to the CO and/or $CO_2$ generated, e.g., by hydrotreatment of a biocomponent feed.

Catalytic dewaxing relates to the removal and/or isomerization of relatively long-chain, paraffinic molecules from feeds. Catalytic dewaxing can be accomplished by selectively cracking and/or by hydroisomerizing these linear molecules. Hydrodewaxing catalysts can comprise molecular sieves such as crystalline aluminosilicates (zeolites) or silicoaluminophosphates (SAPOs). Additionally or alternately, the molecular sieve can be a 1-D or 3-D molecular sieve, for example a 10-member ring 1-D molecular sieve. Examples of molecular sieves useful for dewaxing can include, but are not limited to, ZSM-48, ZSM-22, ZSM-23, ZSM-35, zeolite Beta, USY, ZSM-5, and combinations thereof. In a preferred embodiment, the molecular sieve can comprise ZSM-5, ZSM-22, ZSM-23, ZSM-35, ZSM-48, and combinations thereof, particularly ZSM-5, ZSM-48, and/or ZSM-23. Optionally, the dewaxing catalyst can include a binder, such as alumina, titania, silica, silica-alumina, zirconia, or a combination thereof, for example alumina and/or titania, or one or more of titania, silica, and zirconia. Additionally or alternately, a portion of the catalyst in the dewaxing reactor can comprise or be a hydrotreatment catalyst.

One feature of molecular sieves that can impact the activity of the molecular sieve includes the ratio of silica to alumina ($Si/Al_2$) in the molecular sieve. For instance, the molecular sieve can have a silica to alumina ratio of about 200:1 or less, for example about 120:1 or less, about 100:1 or less, about 90:1 or less, or about 75:1 or less. Additionally or alternately, the molecular sieve can have a silica to alumina ratio of at least about 30:1, for example at least about 50:1 or at least about 65:1.

The dewaxing catalyst can also typically include a metal hydrogenation component, such as a Group VIII metal. Suitable Group VIII metals can include Pt, Pd, Ni, or combinations thereof. Optionally, Co can be included in the aforementioned list. The dewaxing catalyst can include at least about 0.1 wt % of the Group VIII metal(s), for example at least about 0.3 wt %, at least about 0.5 wt %, at least about 0.6 wt %, at least about 1.0 wt %, at least about 2.5 wt %, or at least about 5.0 wt %. Additionally or alternately, the dewaxing catalyst can include about 10.0 wt % or less of the Group VIII metal(s), for example about 5.0 wt % or less, about 2.5 wt % or less, about 1.5 wt % or less, or about 1.0 wt % or less. In one particular embodiment, the dewaxing catalyst can include from about 0.1 wt % to about 1.5 wt % of Pt and/or Pd.

In some embodiments, the dewaxing catalyst can include as an additional hydrogenation component at least one Group VIB metal, such as W and/or Mo. Such Group VIB metals can typically be used in conjunction with the at least one Group VIII metal, such as Ni and/or Co. An example of such an embodiment could be a dewaxing catalyst that includes NiW, NiMo, or NiMoW. When present, the dewaxing catalyst can include at least about 0.5 wt % of the Group VIB metal(s), for example at least about 1.0 wt %, at least about 2.5 wt %, or at least about 5.0 wt %. Additionally or alternately, the dewaxing catalyst can include about 20.0 wt % or less of the Group VIB metal(s), for example about 15.0 wt % or less, about 10.0 wt % or less, about 5.0 wt % or less, or about 1.0 wt % or less. Where the dewaxing catalyst contains only Group VIII metals, however, Pt and/or Pd is(are) the preferred Group VIII metal(s).

Catalytic dewaxing can be performed by exposing a feedstock to a dewaxing catalyst under effective (catalytic) dewaxing conditions. Effective dewaxing temperatures can be at least about 500° F. (about 260° C.), for example at least about 550° F. (about 288° C.), at least about 600° F. (about 316° C.), or at least about 650° F. (about 343° C.). Additionally or alternately, the temperature can be about 750° F. (about 399° C.) or less, for example about 700° F. (about 371° C.) or less or about 650° F. (about 343° C.) or less. Effective dewaxing pressures can be at least about 200 psig (about 1.4 MPag), for example at least about 400 psig (about 2.8 MPag), at least about 500 psig (about 3.4 MPag), at least about 750 psig (about 5.2 MPag), or at least about 1000 psig (about 6.9 MPag). Additionally or alternately, the pressure can be about 2250 psig (about 15.5 MPag) or less, for example about 1500 psig (about 10.3 MPag) or less, about 1200 psig (about 8.2 MPag) or less, about 1000 psig (about 6.9 MPag) or less, or about 800 psig (about 5.5 MPag) or less. Effective dewaxing LHSVs can be at least about 0.1 $hr^{-1}$, for example at least about 0.2 $hr^{-1}$, at least about 0.5 $hr^{-1}$, at least about 1.0 $hr^{-1}$, or at least about 1.5 $hr^{-1}$. Additionally or alternately, the LHSV can be about 15 $hr^{-1}$ or less, for example about 10.0 $hr^{-1}$ or less, about 5.0 $hr^{-1}$ or less, about 3.0 $hr^{-1}$ or less, or about 2.0 $hr^{-1}$ or less. Further additionally or alternately, the temperature, pressure, and LHSV for a liquid-continuous reactor can comprise conditions suitable for use in a trickle bed reactor.

Continuous Liquid Phase Beds—Hydrotreating and/or Hydrofinishing

In some embodiments, the reaction stage having the continuous liquid phase environment can be configured for types of hydroprocessing other than (catalytic) dewaxing, e.g., hydrotreatment and/or hydrofinishing. Indeed, it is possible that the continuous liquid phase environment can be configured so that both dewaxing and another form of hydroprocessing are attained therein, either simultaneously or separately within a single "stage". Particularly in such a multifunctional configuration, a mixture of two or more types of catalysts and/or a catalyst with multiple types of hydroprocessing activity can be used.

In such multifunctional embodiments, the reaction conditions in the stage having the continuous liquid environment can comprise the effective hydrotreatment conditions described above, the effective dewaxing conditions described above, and/or effective hydrofinishing conditions. Note that, if effective hydrotreatment conditions are used, the treat gas rate can reflect the nature of the continuous liquid phase processing environment, and therefore can correspond to the amount of dissolved hydrogen in the liquid phase (including any non-continuous phase hydrogen gas, e.g., when the hydrogen need exceeds the solubility limit of dissolved hydrogen and additional gas phase hydrogen is added).

A hydrofinishing stage can be relatively similar to a hydrotreating stage, with appropriately similar effective conditions. For example, hydrofinishing can comprise relatively mild hydrotreating, particularly directed to saturating (in this context chemically, not physically) any remaining olefins and/or residual aromatics. Effective conditions for hydrofinishing can include, but are not necessarily limited to, a temperature from about 125° C. to about 425° C., for example from about 150° C. to about 350° C. or from about 180° C. to about 280° C., a total pressure from about 400 psig (about 2.9 MPag) to about 3000 psig (about 20.7 MPag), for example from about 500 psig (about 3.4 MPag) to about 3000 psig (about 20.7 MPag) or from about 1500 psig (about 10.3 MPag) to about 2500 psig (about 17.2 MPag), and an LHSV from about 0.1 $hr^{-1}$ to about 5 $hr^{-1}$, for example from about 0.5 $hr^{-1}$ to about 3 $hr^{-1}$ or from about 0.5 $hr^{-1}$ to about 1.5 $hr^{-1}$. The hydrogen treat gas rate can be based on the amount of hydrogen dissolved in the continuous liquid phase.

Due to the similarities between hydrotreating and hydrofinishing noted above, suitable catalysts for hydrofinishing can include hydrotreating catalysts, such as the hydrotreating catalysts described above.

Additionally or alternately, hydrofinishing catalysts can include catalysts containing Group VIB metals, Group VIII (non-noble) metals, and mixtures thereof. In an embodiment, the sulfide of at least one of the metals can have a relatively strong hydrogenation function. Alternately, the hydrofinishing catalyst can include a Group VIII noble metal, such as Pt and/or Pd. These catalysts may include bulk metal catalysts wherein the amount of metal(s) is(are) about 50 wt % or greater based on catalyst. Particularly in embodiments where the catalyst is supported (and thus not a bulk catalyst), the amount of Group VIII metal(s) can be at least about 0.1 wt %, based on the total weight of the catalyst, for example at least about 0.5 wt %, at least about 0.6 wt %, at least about 0.7 wt %, at least about 0.8 wt %, at least about 0.9 wt %, or at least about 1.0 wt %. Additionally or alternately, the amount of Group VIII metal(s) can be about 1.0 wt % or less, for example about 0.9 wt % or less, about 0.75 wt % or less, or about 0.6 wt % or less. Further additionally or alternately, the total amount of all metals, either individually or in mixtures, can be at least about 0.1 wt %, for example at least about 0.25 wt %, at least about 0.5 wt %, at least about 0.6 wt %, at least about 0.75 wt %, or at least 1 wt %. Still further additionally or alternately, the total amount of all metals, either individually or in mixtures, can be about 35 wt % or less, for example about 20 wt % or less, about 15 wt % or less, about 10 wt % or less, or about 5 wt % or less.

When the catalysts are supported catalysts, suitable metal oxide supports can include low acidic oxides such as silica, alumina, silica-aluminas, titania, and combinations thereof, particularly comprising alumina. Preferred hydrofinishing catalysts for aromatic saturation (and/or hydrofinishing) can comprise at least one metal whose sulfide exhibits a relatively strong hydrogenation function on a porous support, which can include amorphous or crystalline oxide materials such as alumina, silica, and silica-alumina. Additionally or alternately, when present, the support materials may be modified, such as by halogenation, or in particular fluorination. The metal content of the catalyst can often be as high as about 20 wt % for non-noble metals. Additionally or alternately, the hydrofinishing catalyst can include a crystalline material belonging to the M41S class or family, which are mesoporous materials having relatively high silica content, including but not limited to MCM-41, MCM-48, MCM-50, and combinations thereof (particularly comprising MCM-41). When the M41S materials include binders, suitable binders can include alumina, silica, and/or any other binder or combination of binders that provides a relatively high productivity and/or a relatively low density catalyst.

Product Properties

During hydrotreatment, the sulfur and nitrogen contents of the feedstock can preferably be reduced. The sulfur, nitrogen, and/or oxygen contents described below can represent the content in a treated feed after processing in the hydroprocessing stage with a continuous liquid phase environment. Additionally or alternatively, the sulfur, nitrogen, and/or oxygen contents described below can correspond to a treated feed after the last hydrotreating stage having a continuous gas phase environment. For example, if the final reaction stage(s) having a liquid continuous environment is(are) operated under effective catalytic dewaxing and/or effective hydrofinishing conditions, the final reaction stage may have little or no impact on the amount of sulfur, nitrogen, and/or oxygen in the final liquid product.

With regard to sulfur, one or more hydrotreatment stages can advantageously reduce the sulfur content to a suitable level, such to about 1000 wppm or less, for example about 500 wppm or less, about 100 wppm or less, about 50 wppm or less, about 30 wppm or less, about 20 wppm or less, about 15 wppm or less, about 10 wppm or less, or about 5 wppm less. With regard to nitrogen, the hydrotreating stage(s) can additionally or alternatively reduce the nitrogen content of the feed to about 100 wppm or less, for example about 50 wppm or less, about 20 wppm or less, about 15 wppm or less, about 10 wppm or less, about 5 wppm or less, or about 3 wppm or less. Hydrotreatment can additionally or alternatively be used to deoxygenate (e.g., substantially deoxygenate, which can correspond to removing at least 90 mol %, for example at least 95 mol %, at least 98 mol %, or at least 99 mol % of the oxygen present, and/or which can correspond to reducing the oxygenate level to 0.1 wt % or less, for example 0.05 wt % or less, 0.01 wt % or less, or 0.005 wt % or less) the biocomponent or other oxygen-containing feedstock. Deoxygenating a feed can avoid problems with catalyst poisoning and/or deactivation due to the creation of water or carbon oxides during hydroprocessing.

Typical mineral distillate feeds suitable for conversion into a diesel fuel product can have initial cloud points of at least about −5° F. (about −21° C.), for example at least about 0° F. (about −18° C.), at least about 5° F. (about −15° C.), at least about 10° F. (about −12° C.), at least about 15° F. (about −9° C.), from about −4° F. (about −20° C.) to about 41° F. (about 5° C.), or from about 25° F. (about −4° C.) to about 50° F. (about 10° C.). Similarly, the initial cloud point of typical biocomponent feeds can be up to about 70° F. (about 21° C.). As a result, the biocomponent feed and/or the mixed biocomponent/mineral feed can have a cloud point of about −5° C. or more, for example about 0° C. or more, about 5° C. or more, about 10° C. or more. In various embodiments, a product from the dewaxing stage can be a distillate product that can be characterized by at least one cold flow property, such as a pour point, a cloud point, a cold filter plugging point, or a combination thereof. When a diesel fuel product is produced by the above methods, the diesel product can advantageously have a cloud point at least about 5° C. lower than the cloud point of the feed into the dewaxing stage, for example at least about 10° C. lower, at least about 20° C. lower, at least about 30° C. lower, at least about 40° C. lower, or at least about 50° C. lower. Additionally or alternatively, the cloud point of the dewaxed product can be about 0° C. or less, for example about −5° C. or less, about −10° C. or less, about −15° C. or less, or about −20° C. or less. Further additionally or alternatively, the cloud point of the dewaxed feed can be at least about −40° C., for example at least about −35° C., at least about −30° C., at least about −25° C., at least about −20° C., or at least about −15° C. Still further additionally or alternatively, the product from the dewaxing stage can have at least one cold flow property that is at least about 10° C. lower than the corresponding property of the feedstock, for example at least about 20° C. lower or at least about 30° C. lower.

Sample Reaction Systems

A reaction system suitable for carrying out the above process(es) is(are) shown schematically in FIG. 1. In FIG. 1, a hydrocarbon feedstock 105 is introduced into a reactor. The hydrocarbon feedstock 105 can be a biocomponent feed, a mineral feed, or a mixture of a biocomponent and a mineral feed. A mixed stream 117 of a hydrogen containing gas flow and a recycled product stream into which hydrogen is at least partially dissolved can also be introduced. The mixed stream 117 can be formed by mixing a hydrogen gas flow 118 from hydrogen source 108 with a portion of recycled product 157. Optionally, the hydrogen containing gas flow and the recycled product stream could be introduced separately. Additionally or alternatively, mixed stream 117 could optionally be combined with hydrocarbon feedstock 105 prior to entering the reactor.

The hydrocarbon feedstock 105 and mixed stream 117 can pass downstream through the hydrotreating catalyst beds 120. The feedstock can be exposed to the hydrotreating catalyst beds 120 under effective hydrotreatment conditions in a continuous gas phase environment. After the last hydrotreating catalyst bed 120, the resulting hydrotreated effluent can enter a transition zone 130. In the embodiment shown in FIG. 1, transition zone 130 can include a series of optional stripping trays 136. Note that the presence of the stripping trays does not necessarily require that a stripping gas is used. Gas in the effluent can be exhausted via one or more conduits 132. The liquid portion of the effluent can continue downstream to hydroprocessing stage 140, which can exhibit a continuous liquid phase environment. The effluent from hydroprocessing stage 140 can then exit the reactor to form a recycled product stream 157 and a diesel product stream 147. Portions of the recycled product stream 157 can be mixed with a hydrogen containing gas 128 to form recycled product inputs 127 that can enter the reactor, e.g., prior to each of the beds after the first bed. Recycled product inputs 127 can optionally include a gas phase hydrogen-containing component as well. The remaining portion of recycled product stream 157 can be combined with hydrogen-containing stream 118 to form the mixed stream 117. Optionally, the final recycled product input 127 can be introduced into the reactor downstream from the transition zone 130.

Figure 2:
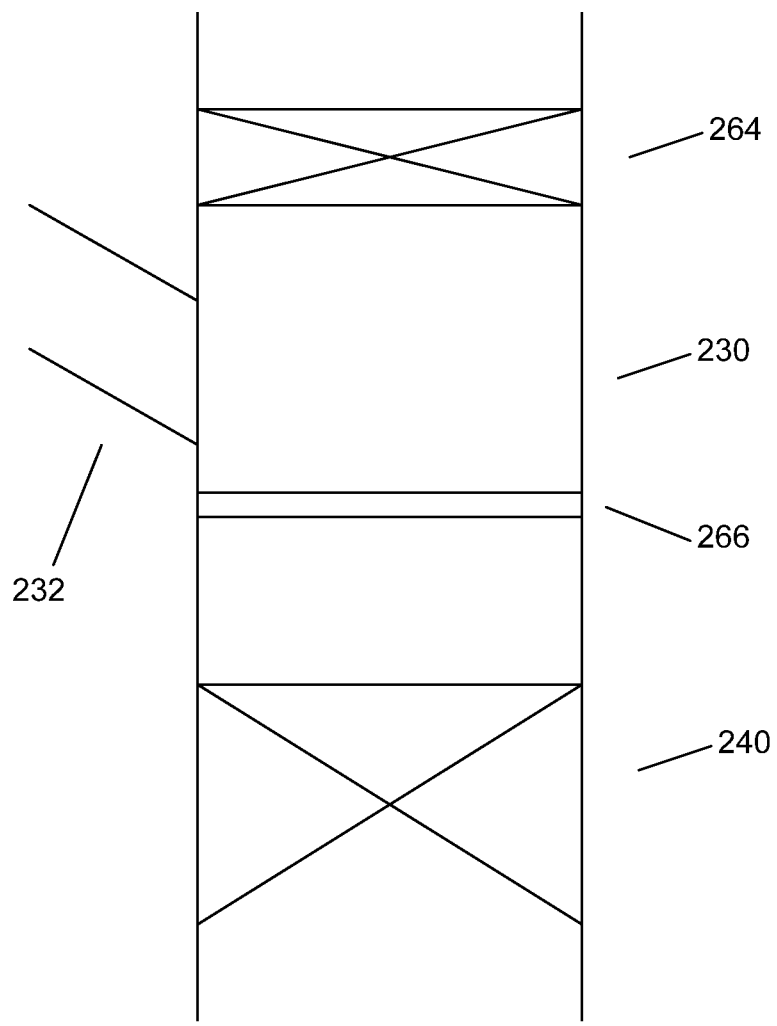
FIG. 2 schematically depicts a portion of a reaction system according to an embodiment of the invention.

FIG. 2 schematically shows a portion of a reactor according to an embodiment of the invention. In FIG. 2, the portion of the reactor shown is the portion downstream from the final hydrotreating bed or stage having a continuous gas phase environment. This portion is shown to depict reactor internals that can be used in this type of embodiment. In the embodiment shown in FIG. 2, the effluent from the hydrotreating bed can pass through (relatively) inert catalyst bed 264 to enter transition zone 230. Optionally, (relatively) inert catalyst bed 264 can include (or be at least partially replaced by) other types of internals, such as holding trays, perforated plates, or the like, or any combination thereof. After entering transition zone 230, the gas can be exhausted via one or more conduits 232. Optionally, one or more holding trays, perforated plates, (relatively) inert catalyst beds, stripping trays, or other internals 266 can be included at the bottom of the transition zone. After leaving the transition zone, the liquid portion of the effluent can enter hydroprocessing zone 240 that has a continuous liquid phase environment.

Figure 3:
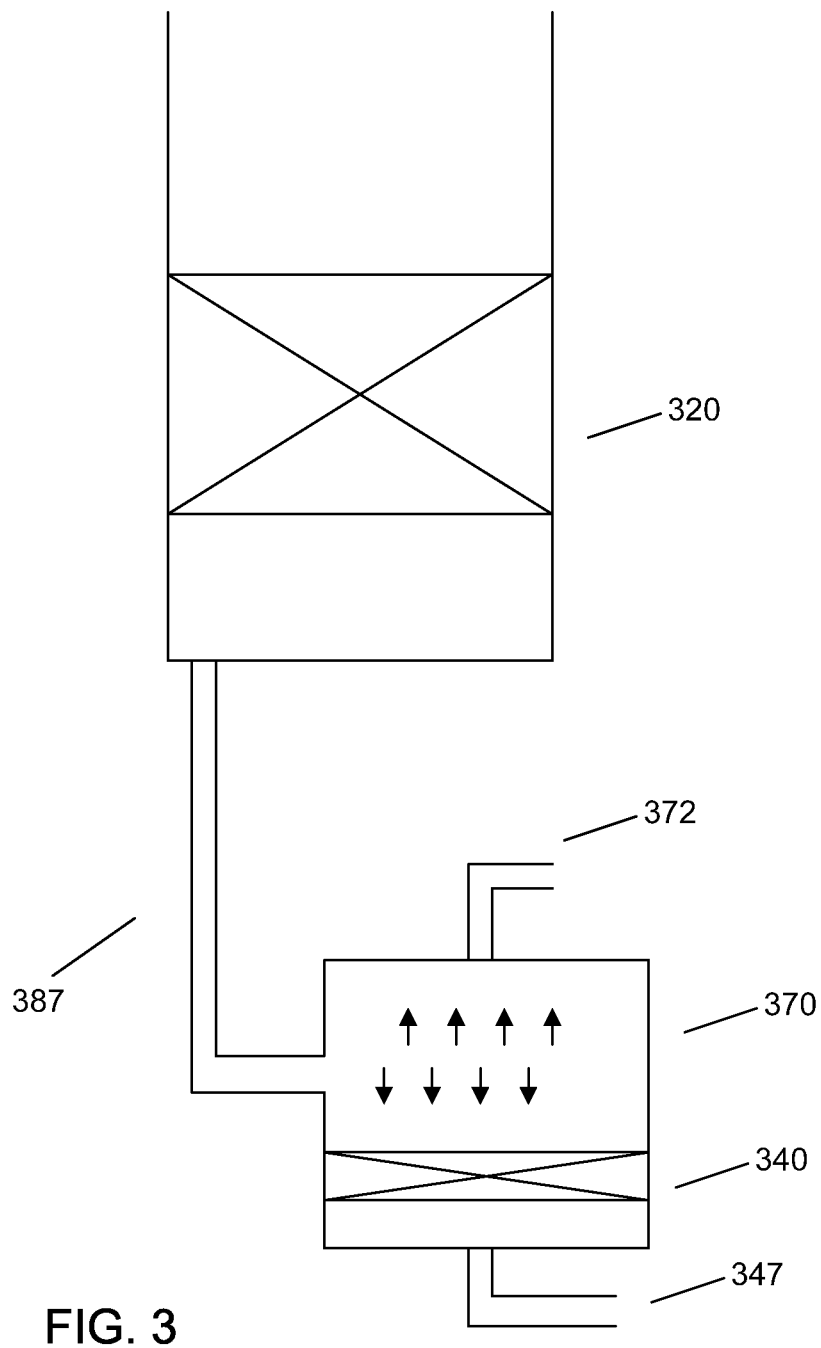
FIG. 3 schematically depicts a portion of a reaction system according to an alternative embodiment of the invention.

FIG. 3 schematically shows a portion of a configuration according to an embodiment of the invention. In FIG. 3, hydrotreating zone 320 is a hydrotreating zone having a continuous gas phase environment. The effluent from hydrotreating zone 320 can exit the reactor via conduit 387 and can thereafter enter a separation device 370, such as a separator drum. In the separation device, a catalyst bed 340 can be included in the lower portion of the device, so that a hydroprocessing stage in a continuous liquid phase environment can be achieved. The gas phase portion of the effluent from separation device 370 can exit via conduit 372. The liquid phase portion, which can first be exposed to the hydroprocessing bed 340 under effective hydroprocessing conditions, can exit separation device 370 via conduit 347.

Figure 4:
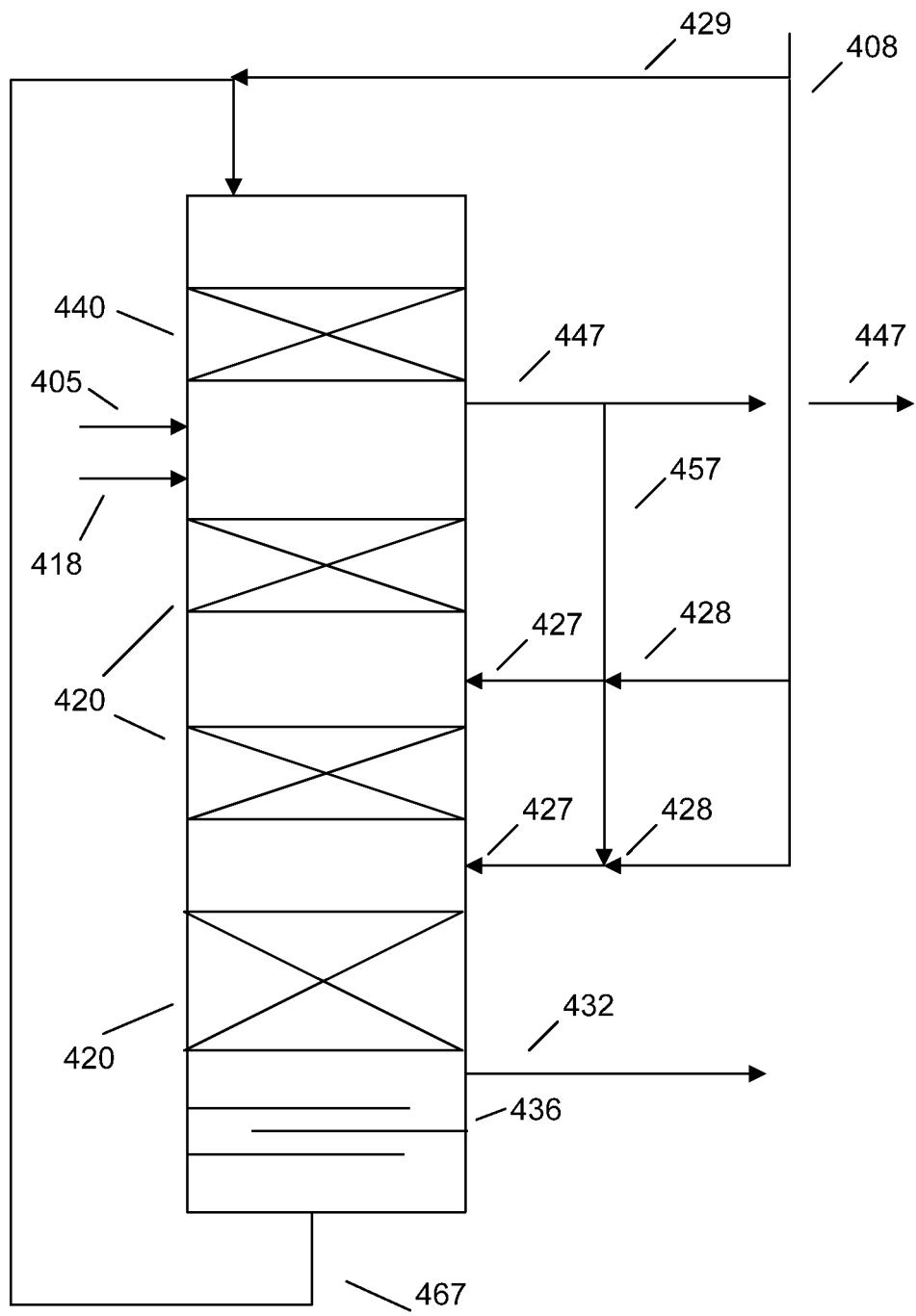
FIG. 4 schematically depicts an alternative reaction system suitable for performing an embodiment of the invention.

FIG. 4 shows an example of a reaction system that can be used according to the invention. In FIG. 4, the entry point for fresh hydrocarbon feedstock 405 can be located not at the top of the reactor. Instead, the "top" reaction zone in the reactor can be a continuous liquid processing zone 440. In FIG. 4, a hydrocarbon feedstock 405 can be introduced into the reactor prior to the first continuous gas phase hydrotreating zone 420. The hydrocarbon feedstock 405 can be a biocomponent feed, a mineral feed, or a mixture thereof. A hydrogen gas flow 418 can be introduced prior to the first continuous gas phase hydrotreating zone. Optionally, the hydrogen containing gas flow 418 could be combined with hydrocarbon feedstock 405 prior to entering the reactor. The hydrocarbon feedstock can additionally or alternately be mixed with a portion of the effluent from continuous liquid processing zone 440 not removed from the reactor as diesel product stream 447.

The hydrocarbon feedstock 405 (and optionally but preferably any effluent from zone 440) can pass downstream through the hydrotreating catalyst beds 420 under effective hydrotreatment conditions in a continuous gas phase environment. After the last hydrotreating catalyst bed 420, the resulting hydrotreated effluent can be separated into a gas phase portion and a liquid phase portion, such as by using stripping trays 436. The gas phase portion of the effluent can be removed from the reactor via conduit 432. The liquid portion of the effluent can continue "downstream" in the flow scheme of this reactor via conduit 467 to hydroprocessing stage 440, which can have a continuous liquid phase environment. At least a portion of the effluent from hydroprocessing stage 440 can then exit the reactor, e.g., as diesel product stream 447. Note that the exit conduit for diesel product stream 447 is shown with a gap in FIG. 4 only to clarify that diesel product stream is not being mixed with hydrogen source 408. One or more portions of the diesel product stream 447 can be separated off to make a recycled product stream 457. The recycled portion(s) can be mixed with a hydrogen containing gas 428 to form recycled product input(s) 427 that can enter the reactor prior to hydrotreating zones 420. Recycled product input(s) 427 can optionally include a gas phase hydrogen-containing component as well.

It is noted that the embodiments disclosed in FIGS. 2 and/or 3 can be used together or separately, in combination with the relevant portions of the embodiments disclosed in FIGS. 1 and/or 4.

Additional/Alternate Embodiments

Additionally or alternately, the invention can include one or more of the following embodiments.

Embodiment 1

A method for making a diesel fuel product, comprising: contacting a feedstock with a hydrotreating catalyst in a plurality of hydrotreating stages under effective hydrotreating conditions, each hydrotreating stage having a continuous gas phase environment, at least a portion of the feedstock being comprised of a biocomponent feed, the feedstock having an oxygen content of at least about 1 wt % and a sulfur content of at least about 500 wppm, the feedstock having a first stoichiometric hydrogen need for said hydrotreating; mixing the feedstock, prior to or during contact with at least one additional hydrotreating stage, with a recycled product stream into which hydrogen is at least partially dissolved, the at least one additional hydrotreating stage being downstream from at least one of the plurality of hydrotreating stages; mixing the effluent from the plurality of hydrotreating stages with a second recycled product stream into which hydrogen is at least partially dissolved; separating the effluent from the plurality of hydrotreating stages into a gas phase effluent portion and a liquid phase effluent portion; and contacting the liquid phase effluent portion with a catalyst in a hydroprocessing stage having a continuous liquid phase environment under effective hydroprocessing conditions to form a diesel fuel product, the liquid phase effluent portion having a second stoichiometric hydrogen need for said hydroprocessing stage, the diesel fuel product being substantially deoxygenated and having a sulfur content of about 100 wppm or less, wherein the total treat gas rate of hydrogen relative to the feed is less than about 1.2 times the combined first and second stoichiometric hydrogen needs, and wherein the total hydrogen treat gas rate is about 750 scf/bbl (about 130 $Nm^3/m^3$) or less.

Embodiment 2

A method for making a diesel fuel product, comprising: introducing a feedstock into a reactor, the reactor including one or more hydrotreating stages in a continuous gas phase environment and a dewaxing stage in a continuous liquid phase environment, at least a portion of the feedstock being comprised of a biocomponent feed, the feedstock having an oxygen content of at least about 1 wt % and having a cloud point; contacting the feedstock with hydrotreating catalyst in the one or more hydrotreating stages under effective hydrotreating conditions, the feedstock having a first stoichiometric hydrogen need for said hydrotreating stages; mixing the feedstock, prior to or during contact with hydrotreating catalyst in at least one hydrotreating stage, with a recycled product stream into which hydrogen is or becomes at least partially dissolved; mixing the feedstock, prior to contact with dewaxing catalyst in the dewaxing stage, with a second recycled product stream into which hydrogen is or becomes at least partially dissolved; exhausting from the reactor a gas phase effluent portion of a hydrotreated effluent from the one or more hydrotreating stages; and contacting a liquid phase effluent portion of said hydrotreated effluent with dewaxing catalyst in the dewaxing stage under effective dewaxing conditions to form a diesel fuel product, the liquid phase effluent portion having a second stoichiometric hydrogen need for said dewaxing stage, the diesel fuel product being substantially deoxygenated and having a cloud point at least about 10° C. below the cloud point of the feedstock.

Embodiment 3

The method of embodiment 1 or embodiment 2, wherein exhausting the gas phase effluent portion and/or separating the effluent from the plurality of hydrotreating stages is performed without using a stripping gas.

Embodiment 4

The method of any one of the previous embodiments, wherein the effective hydrotreating conditions include a temperature from about 500° F. (about 260° C.) to about 800° F. (about 427° C.), a total pressure from about 300 psig (about 2.1 MPag) to about 3000 psig (about 20.7 MPag), an LHSV from about 0.2 hr$^{-1}$ to about 10 hr$^{-1}$, and a hydrogen treat gas rate from about 300 scf/bbl (about 51 Nm$^3$/m$^3$) to about 10000 scf/bbl (about 1700 Nm$^3$/m$^3$).

Embodiment 5

The method of any one of the previous embodiments, wherein the total treat gas rate of hydrogen is about 900 scf/bbl (about 150 Nm$^3$/m$^3$) or less, for example about 550 scf/bbl (about 93 Nm$^3$/m$^3$) or less.

Embodiment 6

The method of any one of the previous embodiments, wherein the hydrotreating catalyst comprises a Group VIB metal and Group VIII metal on a support, for example Mo and Co.

Embodiment 7

The method of any one of the previous embodiments, wherein the hydroprocessing stage contains dewaxing catalyst and is operated under effective catalytic dewaxing conditions, and wherein the effective catalytic dewaxing conditions include a temperature from about 500° F. (about 260° C.) to about 750° F. (about 399° C.), a total pressure from about 400 psig (about 2.8 MPag) to about 1500 psig (about 10.3 MPag), and an LHSV of about 0.2 hr$^{-1}$ to about 10.0 hr$^{-1}$.

Embodiment 8

The method of any one of the previous embodiments, wherein the dewaxing catalyst comprises a molecular sieve and a supported metal, the molecular sieve comprising ZSM-5, ZSM-22, ZSM-23, ZSM-35, ZSM-48, or a combination thereof, for example being ZSM-23 and/or ZSM-48.

Embodiment 9

The method of embodiment 8, wherein the supported metal is Pt and/or Pd, the amount of supported metal being from about 0.1 wt % to about 1.5 wt %.

Embodiment 10

The method of any one of embodiments 2-9, wherein a recycled product stream is mixed with feedstock prior to or during each hydrotreating stage, the recycled product stream having hydrogen at least partially dissolved therein.

Embodiment 11

The method of any one of the previous embodiments, wherein the feedstock comprises from about 10 wt % to about 50 wt % biocomponent feed, or wherein the feedstock comprises from about 50 wt % to about 90 wt % biocomponent feed.

EXAMPLES

Example 1

Reduced Hydrogen Consumption for Processing Feedstock Including Biocomponent Feed (Soybean Oil)

A mixture of a biocomponent diesel feed and a mineral diesel feed were co-processed under hydrotreatment conditions. The feed included about 30% by weight of soybean oil. Published reports indicate that the expected hydrogen consumption for hydrodeoxygenation and olefin saturation of soybean oil is between about 1500 scf/bbl (about 250 Nm$^3$/m$^3$) and about 1900 scf/bbl (about 320 Nm$^3$/m$^3$). Based on this, about 1700 scf/bbl (about 290 Nm$^3$/m$^3$) was selected as an expected hydrogen consumption for the soybean oil. The remaining ~70 wt % of the mixed feed comprised a mineral feedstock corresponding to a light gasoil. The expected hydrogen consumption for this mineral light gasoil feed was about 100 scf/bbl (about 17 Nm$^3$/m$^3$). Because the feed was about 30% soybean and about 70% of the mineral light gasoil, an expected hydrogen consumption for the blended feed was calculated to be about 580 scf/bbl (about 99 Nm$^3$/m$^3$).

The ~30/70 mixture soybean and mineral oil feed was processed in the presence of an alumina-supported CoMo catalyst under two sets of conditions where the ratio of treat gas to feed was lower than the typically recommended ratio. The first set of conditions included a process temperature of about 625° F. (about 329° C.), an H$_2$ partial pressure of about 320 psig (about 2.2 MPag), a total treat gas ratio of about 1450 scf/bbl (about 250 Nm$^3$/m$^3$) of ~80% hydrogen, corresponding to a hydrogen treat gas ratio of about 1160 scf/bbl (about 197 Nm$^3$/m$^3$), and an LHSV of about 0.6 hr$^{-1}$. The hydrogen treat gas ratio in the first set of conditions corresponds to about two times the expected hydrogen consumption for the mixed feed. In the second set of conditions, the treat gas ratio was reduced to about 780 scf/bbl (about 130 Nm$^3$/m$^3$) for total gas (about 624 scf/bbl, or about 106 Nm$^3$/m$^3$, of hydrogen), which is less than about 110% of the hydrogen need. The target H$_2$ partial pressure was also about 320 psig (about 2.2 MPag), but, due to natural process variations, a hydrogen partial pressure of about 311 psig (about 2.14 MPag) was measured at the outlet (within reasonable error; close enough to have minimal or no significant impact on the results).

The soybean oil portion of the feed contained roughly 10 wt % oxygen content. Because the feed was about 30% soybean oil, the total feedstock contained about 3 wt % oxygen content. Under the reaction conditions, at least about 98% of the triglycerides in the feed were converted. The oxygen content remaining in the hydrotreated (and/or further hydroprocessed) product was less than 0.1 wt %, which included oxygen gas dissolved in the feed. This level of oxygen removal is believed to be sufficient to allow use in diesel fuel applications.

The characteristics of the effluent from these two runs are shown in Table 1. In Table 1, the yield columns for CO, $CO_2$, and $H_2O$ include two numbers. The first number represents the measured yield, while the second number shows the corresponding yield if the feed had been 100% soybean oil. Table 1 shows that reducing the treat gas ratio led to a lower relative hydrogen consumption for the soybean oil. Table 1 also shows that decreasing the treat gas ratio resulted in a decrease in the yield of $H_2O$ and CO, though an increase in $CO_2$ yield. The reduction in CO production was surprising, as prior reports of processing at reduced hydrogen partial pressures have shown increasing amounts of CO production. Without being bound by any particular theory, it is believed that the combination of reduced treat gas ratio and reduced hydrogen partial pressure can somehow facilitate the water gas shift reaction. This can lead to increased in situ hydrogen production and thus a reduction in CO production.

TABLE 1

| $H_2$ Treat Gas Ratio [scf/bbl ($Nm^3/m^3$)] | Product Sulfur [wppm] | CO Yield [wt %] | $CO_2$ Yield [wt %] | $H_2O$ Yield [wt %] | Soy $H_2$ consumption [scf/bbl ($Nm^3/m^3$)] |
|---|---|---|---|---|---|
| 624 (106) | 325 | 0.25 (0.8) | 2.5 (8.4) | 1.3 (4.2) | 968 (165) |
| 1160 (197) | 125 | 0.5 (1.6) | 1.8 (6.1) | 1.7 (5.6) | 1223 (208) |

Example 2

Reduced Hydrogen Consumption for Processing Feedstock Including Biocomponent Feed (Palm Oil)

At relatively high treat gas ratios, palm oil hydrogen consumption has been measured between about 1250 scf/bbl (about 210 $Nm^3/m^3$) and about 1500 scf/bbl (about 250 $Nm^3/m^3$). This value can be reduced by using a relatively low treat gas ratio and a relatively low hydrogen partial pressure. Palm oil was co-processed in a feed with about 30 wt % palm oil and about 70 wt % of a mineral light gasoil feed similar to that described in Example 1. For this ~30/70 mixture of palm oil and light gasoil, the expected hydrogen consumption was calculated to be between about 450 scf/bbl (about 76 $Nm^3/m^3$) and about 520 scf/bbl (about 88 $Nm^3/m^3$). A treat gas ratio of about 650 scf/bbl (about 110 $Nm^3/m^3$) was used to hydrotreat the mixed feed in the presence of an alumina-supported CoMo hydrotreatment catalyst. The hydrogen consumption for the palm oil turned out to be less than about 800 scf/bbl (about 140 $Nm^3/m^3$). The water yield was substantially reduced, relative to an expected water yield from processing at a treat gas ratio greater than two times the expected hydrogen need.

Example 3

Processing of a Feedstock Including Biocomponent Feed

The following is a prophetic example. The feedstock for the example is a mixture of a vegetable oil feed containing about 10 wt % oxygen and having an expected hydrogen consumption of about 1600 scf/bbl (about 270 $Nm^3/m^3$). This biocomponent feed is mixed with a mineral gasoil feed suitable for use as a diesel feedstock, and having a sulfur content of about 2 wt %. The expected hydrogen consumption for this feed is about 160 scf/bbl (about 27 $Nm^3/m^3$). The biocomponent feed and the mineral feed are mixed in a ~1:3 ratio, to produce a total feed with an expected hydrogen consumption of about 520 scf/bbl (about 88 $Nm^3/m^3$). The cloud point of the mixture is about 18° C.

This feedstock is introduced into a reactor that contains three hydrotreatment beds operated in a continuous gas phase environment, and one dewaxing catalyst bed operated in a liquid continuous environment. Recycled product feeds are introduced into the reactor at several locations. A portion of recycled product feed is introduced at the top of the reactor, while additional portions of recycled feed are introduced prior to each of the catalyst beds after the first catalyst bed. Hydrogen is dissolved in this recycled product at approximately the solubility limit prior to entering the reactor. The ratio of fresh feed to total recycled product in the reactor is about 1:2. The distribution of the recycled product is that about 40% of the recycled product enters the reactor at the top and/or with the fresh feed, while the remaining three recycled product streams each correspond to 20% of the recycled product. The recycled product has a hydrogen solubility of about 150 scf/bbl (about 25 $Nm^3/m^3$). Based on the ~1:2 ratio of fresh feed to recycled product, about 300 scf/bbl (about 50 $Nm^3/m^3$) of hydrogen enters the reactor as dissolved hydrogen. An additional ~500 scf/bbl (about 85 $Nm^3/m^3$) of hydrogen is introduced at or near the top of the reactor, so that an excess of hydrogen is available in the continuous gas phase hydrotreatment zones of the reactor. Alternately, an additional ~220 scf/bbl (about 37 $Nm^3/m^3$) of hydrogen could be introduced into the reactor as a gas phase flow at or near the top of the reactor, in which case the total hydrogen treat gas rate of about 520 scf/bbl (about 88 $Nm^3/m^3$) would match the expected hydrogen consumption.

The hydrotreating catalyst beds contain a supported NiMo catalyst. Effective hydrotreating conditions are selected to achieve a final sulfur content of less than about 100 wppm. The dewaxing catalyst bed contains a bound ZSM-48 catalyst containing less than 1 wt % Pt.

After processing in the hydrotreatment stages in the continuous gas phase environment, with the dewaxing stage in the continuous liquid phase environment, the resulting liquid effluent has a sulfur content of less than about 100 wppm. More than 99% of the oxygen is removed. The cloud point of the liquid effluent is −3° C., which is at least about 20° C. lower than the initial feed.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

What is claimed is:

1. A method for making a diesel fuel product, comprising:
    contacting a feedstock with a hydrotreating catalyst in a plurality of hydrotreating stages under effective hydrotreating conditions, each hydrotreating stage having a continuous gas phase environment, at least a portion of the feedstock being comprised of a biocomponent feed, the feedstock having an oxygen content of at least about 1 wt % and a sulfur content of at least about 500 wppm, the feedstock having a first stoichiometric hydrogen need for said hydrotreating;
    prior to or during contact of the feedstock with at least one additional hydrotreating stage, mixing the feedstock with a recycled product stream into which hydrogen is at least partially dissolved, the at least one additional hydrotreating stage being downstream from at least one of the plurality of hydrotreating stages;

mixing the effluent from the plurality of hydrotreating stages with a second recycled product stream into which hydrogen is at least partially dissolved;

separating the effluent from the plurality of hydrotreating stages into a gas phase effluent portion and a liquid phase effluent portion; and contacting the liquid phase effluent portion with a catalyst in a hydroprocessing stage having a continuous liquid phase environment under effective hydroprocessing conditions to form a diesel fuel product, the liquid phase effluent portion having a second stoichiometric hydrogen need for said hydroprocessing stage, the diesel fuel product being substantially deoxygenated and having a sulfur content of about 100 wppm or less, wherein the total treat gas rate of hydrogen relative to the feed is less than about 1.2 times the combined first and second stoichiometric hydrogen needs, and wherein the total hydrogen treat gas rate is about 750 scf/bbl (about 130 Nm$^3$/m$^3$) or less.

2. The method of claim 1, wherein the total treat gas rate of hydrogen is about 550 scf/bbl (about 93 Nm3/m3) or less.

3. The method of claim 1, wherein separating the effluent from the plurality of hydrotreating stages is performed without using a stripping gas.

4. The method of any of claim 1, wherein the effective hydrotreating conditions include a temperature from about 500° F. (about 260° C.) to about 800° F. (about 427° C.), a total pressure from about 300 psig (about 2.1 MPag) to about 3000 psig (about 20.7 MPag), an LHSV from about 0.2 hr$^{-1}$ to about 10 hr$^{-1}$, and a hydrogen treat gas rate from about 300 scf/bbl (about 51 Nm$^3$/m$^3$) to about 10000 scf/bbl (about 1700 Nm$^3$/m$^3$).

5. The method of claim 4, wherein the hydrogen treat gas rate is about 900 scf/bbl (about 150 Nm$^3$/m$^3$) or less.

6. The method of claim 1, wherein the hydrotreating catalyst comprises a Group VIB metal and Group VIII metal on a support.

7. The method of claim 1, wherein the hydroprocessing stage contains dewaxing catalyst and is operated under effective catalytic dewaxing conditions.

8. The method of claim 7, wherein the effective catalytic dewaxing conditions include a temperature from about 500° F. (about 260° C.) to about 750° F. (about 399° C.), a total pressure from about 400 psig (about 2.8 MPag) to about 1500 psig (about 10.3 MPag), and an LHSV of about 0.2 hr$^{-1}$ to about 10.0 hr$^{-1}$.

9. The method of claim 7, wherein the dewaxing catalyst comprises a molecular sieve and a supported metal, the molecular sieve comprising ZSM-5, ZSM-22, ZSM-23, ZSM-35, ZSM-48, or a combination thereof.

10. A method for making a diesel fuel product, comprising:
introducing a feedstock into a reactor, the reactor including one or more hydrotreating stages in a continuous gas phase environment and a dewaxing stage in a continuous liquid phase environment, at least a portion of the feedstock being comprised of a biocomponent feed, the feedstock having an oxygen content of at least about 1 wt % and having a cloud point;

contacting the feedstock with hydrotreating catalyst in the one or more hydrotreating stages under effective hydrotreating conditions, the feedstock having a first stoichiometric hydrogen need for said hydrotreating stages;

mixing the feedstock, prior to or during contact with hydrotreating catalyst in at least one hydrotreating stage, with a recycled product stream into which hydrogen is or becomes at least partially dissolved;

mixing the feedstock, prior to contact with dewaxing catalyst in the dewaxing stage, with a second recycled product stream into which hydrogen is or becomes at least partially dissolved;

exhausting from the reactor a gas phase effluent portion of a hydrotreated effluent from the one or more hydrotreating stages; and contacting a liquid phase effluent portion of said hydrotreated effluent with dewaxing catalyst in the dewaxing stage under effective dewaxing conditions to form a diesel fuel product, the liquid phase effluent portion having a second stoichiometric hydrogen need for said dewaxing stage, the diesel fuel product being substantially deoxygenated and having a cloud point at least about 10° C. below the cloud point of the feedstock.

11. The method of claim 10, wherein the effective catalytic dewaxing conditions include a temperature from about 500° F. (about 260° C.) to about 750° F. (about 399° C.), a total pressure from about 400 psig (about 2.8 MPag) to about 1500 psig (about 10.3 MPag), and an LHSV of about 0.2 hr$^{-1}$ to about 10.0 hr$^{-1}$.

12. The method of claim 10, wherein the dewaxing catalyst comprises a molecular sieve and a supported metal, the molecular sieve comprising ZSM-5, ZSM-22, ZSM-23, ZSM-35, ZSM-48, or a combination thereof.

13. The method of claim 12, wherein the molecular sieve is ZSM-23, ZSM-48, or a combination thereof.

14. The method of claim 12, wherein the supported metal is Pt and/or Pd, the amount of supported metal being from about 0.1 wt % to about 1.5 wt %.

15. The method of claim 10, wherein the hydrotreating catalyst comprises a Group VIB metal and Group VIII metal on a support.

16. The method of claim 10, wherein the effective hydrotreating conditions include a temperature from about 500° F. (about 260° C.) to about 800° F. (about 427° C.), a total pressure from about 300 psig (about 2.1 MPag) to about 3000 psig (about 20.7 MPag), an LHSV from about 0.2 hr$^{-1}$ to about 10 hr$^{-1}$, and a hydrogen treat gas rate from about 300 scf/bbl (about 51 Nm$^3$/m$^3$) to about 10000 scf/bbl (about 1700 Nm$^3$/m$^3$).

17. The method of claim 16, wherein the hydrogen treat gas rate is about 900 scf/bbl (about 150 Nm$^3$/m$^3$) or less.

18. The method of claim 10, wherein a recycled product stream is mixed with feedstock prior to or during each hydrotreating stage, the recycled product stream having hydrogen at least partially dissolved therein.

19. The method of claim 10, wherein the feedstock comprises from about 10 wt % to about 50 wt % biocomponent feed, or wherein the feedstock comprises from about 50 wt % to about 90 wt % biocomponent feed.

20. The method of claim 10, wherein exhausting the gas phase effluent portion is performed without using a stripping gas.

* * * * *